US009571837B2

(12) United States Patent
Zhou et al.

(10) Patent No.: US 9,571,837 B2
(45) Date of Patent: Feb. 14, 2017

(54) COLOR BLENDING PREVENTION IN VIDEO CODING

(71) Applicant: BROADCOM CORPORATION, Irvine, CA (US)

(72) Inventors: Minhua Zhou, San Diego, CA (US); Peisong Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 344 days.

(21) Appl. No.: 14/148,623

(22) Filed: Jan. 6, 2014

(65) Prior Publication Data

US 2015/0124872 A1 May 7, 2015

Related U.S. Application Data

(60) Provisional application No. 61/899,019, filed on Nov. 1, 2013.

(51) Int. Cl.
*H04N 11/02* (2006.01)
*H04N 19/103* (2014.01)
*H04N 19/186* (2014.01)
*H04N 19/176* (2014.01)
*H04N 19/132* (2014.01)
*H04N 19/154* (2014.01)
*H04N 19/194* (2014.01)

(52) U.S. Cl.
CPC .......... *H04N 19/103* (2014.11); *H04N 19/132* (2014.11); *H04N 19/154* (2014.11); *H04N 19/176* (2014.11); *H04N 19/186* (2014.11); *H04N 19/194* (2014.11)

(58) Field of Classification Search
USPC ........................................ 375/240.01–240.29
See application file for complete search history.

(56) References Cited

U.S. PATENT DOCUMENTS

| | | | | |
|---|---|---|---|---|
| 2008/0031344 | A1* | 2/2008 | Lu | H04N 19/647 375/240.19 |
| 2008/0152000 | A1* | 6/2008 | Kaushik | H04N 19/197 375/240.03 |
| 2014/0079117 | A1* | 3/2014 | Yang | H04N 19/0009 375/240.03 |
| 2014/0301465 | A1* | 10/2014 | Kwon | H04N 19/503 375/240.16 |
| 2015/0092855 | A1* | 4/2015 | Chou | H04N 19/105 375/240.16 |

* cited by examiner

*Primary Examiner* — Leron Beck
(74) *Attorney, Agent, or Firm* — McDermott Will & Emery LLP

(57) ABSTRACT

A method for color blending prevention in video coding may include selecting, in a mode decision phase of an encoding of a current video frame, to encode an output bitstream in skip mode, wherein the skip mode includes altering encoding of the coding unit by setting luma component transform coefficients for the coding unit to zero, revaluating the selection of the skip mode based on quantized chroma coefficients, the quantized chroma coefficients generated from transformed and quantized residual chroma components, confirming the selection of the skip mode when there are no non-zero quantized chroma coefficients, and revoking the selection of the skip mode when there are non-zero quantized chroma coefficients, wherein the non-zero quantized chroma coefficients are transmitted when the selection of the skip mode is revoked.

21 Claims, 13 Drawing Sheets

600

|  | IBBBP | | |
|---|---|---|---|
| Sequence | Y | U | V |
| Sequence 1 | 4.3% | 6.3% | -0.9% |
| Sequence 2 | 22.0% | 30.1% | 31.7% |
| Sequence 3 | 6.3% | 3.9% | 5.9% |
| Sequence 4 | 7.1% | 6.7% | 6.0% |
| Sequence 5 | 12.7% | 12.0% | 12.5% |
| Sequence 6 | 3.2% | -3.2% | -12.8% |
| Sequence 7 | 12.5% | 15.3% | 15.3% |
| ALL | 9.7% | 10.2% | 8.2% |

| Sequence | Resolution | fps | #Frames |
|---|---|---|---|
| Sequence 1 | 1080p | 50 | 500 |
| Sequence 2 | 1080p | 60 | 600 |
| Sequence 3 | 720p | 30 | 600 |
| Sequence 4 | 720p | 30 | 600 |
| Sequence 5 | 720p | 60 | 600 |
| Sequence 6 | 720p | 30 | 600 |
| Sequence 7 | 720p | 30 | 600 |

| Sequence | IBBBP | | |
|---|---|---|---|
| | Y | U | V |
| Sequence1 | 1.1% | -1.7% | -8.6% |
| Sequence 2 | 1.3% | -1.7% | -0.6% |
| Sequence 3 | 1.0% | -4.1% | -2.3% |
| Sequence 4 | 1.4% | -1.9% | -2.7% |
| Sequence 5 | 1.4% | -1.5% | -0.6% |
| Sequence 6 | 1.9% | -10.0% | -18.9% |
| Sequence 7 | 1.1% | -2.0% | -2.1% |
| ALL | 1.3% | -3.3% | -5.1% |

FIG. 9

COLOR BLENDING PREVENTION IN VIDEO CODING

RELATED APPLICATION

This application is a non-provisional of U.S. Provisional Patent Application No. 61/899,019, filed on Nov. 1, 2013 and titled "Color Blending Prevention in Video Coding" which is herein incorporated in its entirety by reference.

BACKGROUND

HEVC (High Efficient Video Coding) is a video compression standard that is also known as H.265. To achieve better coding efficiency, HEVC employs a flexible block coding structure. For example, in HEVC, a picture is resolved into largest coding units or LCUs. A LCU is further composed of coding units or CUs. A CU is further composed of several prediction units or PUs for intra or inter-prediction. HEVC includes a merge mode to derive motion information from spatially or temporally neighboring coding units. The merge mode is named as such because it forms a merged region sharing motion information. A skip mode is considered to be a special case of the merge mode when coded block flags for a coding unit are equal to zero.

Early skip mode evaluation, in a motion estimation and mode decision phase of HEVC, has proven to be effective for the coding efficiency. There can be a significant coding performance loss if skip mode evaluation is switched off in the motion estimation and mode decision phase. However, such an early skip mode evaluation may create coding artifacts in encoded video frames.

Conventionally, only luma data is involved during motion estimation for a regular inter-mode evaluation and for merge/skip mode evaluation due to memory bandwidth and other architecture constraints. Therefore, an early skip mode evaluation and decision is based solely on the luma data. In some cases, when a luma prediction residual is sufficiently small, and can thus be skipped, the chroma prediction residual oftentimes is also small enough to be ignored. However, such a relationship between the luma and the chroma prediction residual is not necessarily true at all times. There can be cases in which the luma prediction residual is small enough to be ignored but the chroma prediction residual is still significantly large and cannot be ignored. In such cases, choosing a skip mode in the motion estimation and mode decision phase may create undesirable coding artifacts (e.g., color blending) because the significantly larger chroma prediction residual is not properly considered.

BRIEF DESCRIPTION OF THE DRAWINGS

A detailed description will be made with reference to the accompanying drawings:

FIG. 6A is a table illustrating coding loss when skip mode evaluation is switched off in a motion estimation and mode decision phase of a HEVC encoder.

FIG. 6B lists video sequences that may be used for a HVEC coding test.

FIG. 9 is a table illustrating reduction of average coding loss in accordance with one or more implementations.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In one or more implementations, to prevent coding artifacts such as color blending, selection of a skip mode is continually evaluated even after the skip mode is chosen in the motion estimation and mode decision phase of an encoder. In the skip mode, luma data transform coefficients are set to zero for a coding unit by an encoder. For chroma data, the encoder still produces residual blocks, and performs transform and quantization. In some implementations, after transform and quantization is complete, the selection of the skip mode is re-evaluated based on quantized chroma transform coefficients. If there are no non-zero quantized chroma coefficients for a coding unit, the selection of the skip mode is confirmed and a current coding unit is skipped. Otherwise, the selection of the skip mode is revoked and the non-zero quantized chroma coefficients are transmitted for the coding unit to compensate a chroma prediction residual.

In this way, the subject technology provides an encoder that can give consideration to chroma data during a skip mode decision process even after the skip mode is chosen in the motion estimation and mode decision phase of the encoder. Such consideration to the chroma data can avoid undesirable coding artifacts (e.g., color blending) caused by an early skip mode decision while still maintaining high coding efficiency for the encoder.

Figure 1:
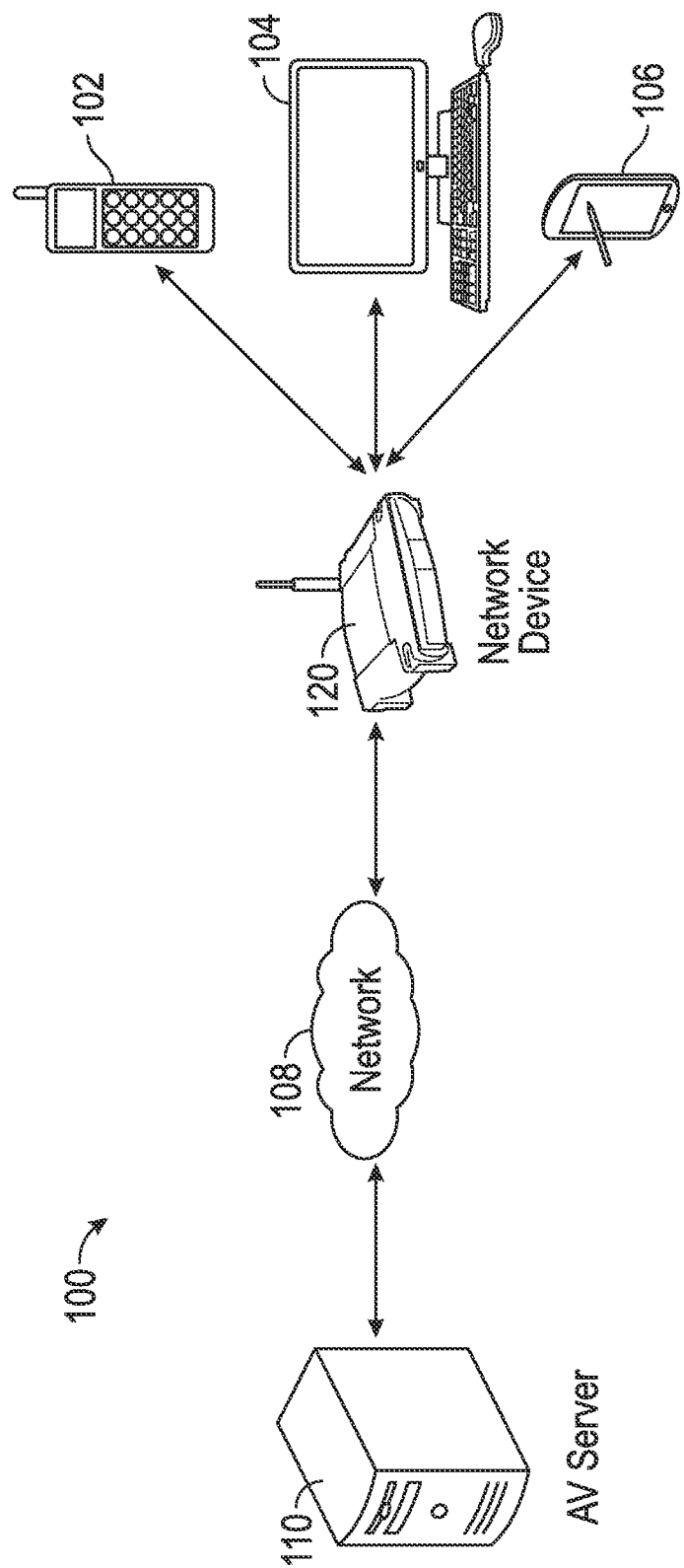
FIG. 1 illustrates an example network environment in which a system for color blending prevention may be implemented in accordance with one or more implementations.

FIG. 1 illustrates an example network environment 100 in which a system for color blending prevention in video coding may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

While the following is discussed with reference to HVEC, it is to be appreciated that the disclosed implementations are not limited to HVEC and can be applied to any other compression standard, including, but not limited to, MPEG AVC/ITU-T H.264, MPEG-2/H.262, MPEG-4, etc. Furthermore, the disclosed implementations are not limited to preventing color blending artifacts and can be used to address and prevent any other form of encoding artifact.

Example network environment 100 includes audio-video (AV) server 110 that is communicably coupled to network device 120, such as by network 108. Example network environment 100 further includes one or more electronic devices 102, 104, 106 that are communicably coupled to network device 120, such as via a local area network (LAN). AV server 110, network device 120, and/or any of electronic devices 102, 104, 106, may be, or may include, one or more components of the electronic system discussed below with respect to FIG. 7.

Network 108 can be a public communication network (such as the Internet, cellular data network, dialup modems over a telephone network) or a private communications network (such as private local area network ("LAN"), leased lines). Network 108 may also include, but is not limited to, any one or more of the following network topologies, including a bus network, a star network, a ring network, a mesh network, a star-bus network, a tree or hierarchical network, and the like. In one or more implementations, network 108 may include one or more transmission networks, such as a coaxial transmission network, a fiber optic transmission network, or generally any transmission network that communicatively couples AV server 110 and network device 120.

AV server 110 can transmit data transmissions that include AV content items, such as television programs, movies, or generally any multimedia content, via network 108, such as by utilizing Data Over Cable Service Interface Specification (DOCSIS). For example, AV server 110 may transmit Internet Protocol (IP) streams, such as unicast, multicast, or broadcast streams, that include AV content items over network 108. In a non-limiting example, AV server 110 may also transmit video content without inclusion of audio data. In one or more implementations, any data transmissions that include AV streams and/or AV data, and/or are associated with AV streams and/or AV data, may be referred to as AV traffic (or AV network traffic), and any data transmissions that do not include, and/or are not associated with, AV streams and/or AV data may be referred to as non-AV traffic (or non-AV network traffic). In one or more implementations, any of the AV streams transmitted by AV server 110 may be, or may include, a transport stream that contains transport stream packets, such as an MPEG transport stream, an MPEG-2 transport stream, HVEC transport stream, or generally any transport stream.

AV server 110 can include, or may be coupled to, one or more processing devices and/or a data store. AV server 110 may include, or may be coupled to an encoder that is configured to give consideration to chroma data in video frames during a skip mode decision process even after skip mode is chosen in the motion estimation and mode decision phase of the encoder. Such consideration to the chroma data can avoid coding artifacts (e.g., color blending) in encoded video frames while still maintaining high coding efficiency for the encoder. The one or more processing devices associated with AV server 110 can execute computer instructions stored in the data store, for example, to encode and transmit AV traffic.

The data store may store the computer instructions on a non-transitory computer-readable medium. The data store may further store one or more AV content items that are transmitted by AV server 110. In one or more implementations, AV server 110 may be a single computing device such as a computer server. Alternatively, AV server 110 may represent multiple computing devices that are working together to perform the actions of a server computer (such as a cloud of computers and/or a distributed system). AV server 110 may be coupled with various databases, storage services, or other computing devices, that may be collocated with AV server 110 or may be disparately located from AV server 110.

Electronic devices 102, 104 and 106 can be computing devices such as laptop or desktop computers, smartphones, personal digital assistants ("PDAs"), portable media players, set-top boxes, tablet computers, televisions or other displays with one or more processors coupled thereto and/or embedded therein, or other appropriate computing devices that can be used for rendering of multimedia content and/or can be coupled to such a device. In the example of FIG. 1, electronic device 102 is depicted as a smart phone, electronic device 104 is depicted as a desktop computer, and electronic device 106 is depicted as a tablet device. In one or more implementations, any of electronic devices 102, 104, 106 may be referred to as a user device or a client device.

Network device 120 can be configured to couple electronic devices 102, 104, 106 to AV server 110 and/or to network 108. For example, network device 120 can receive requests for AV streams from electronic devices 102, 104, 106 and may forward the requests to AV server 110. In response to the requests, network device 120 may receive AV traffic from AV server 110 and may forward the AV traffic to one or more of electronic devices 102, 104, 106. In one or more implementations, network device 120 may be, or may include, a set-top box, for example, a device that can be coupled to an output device, such as a television, and is capable of presenting multimedia content via the output device. In one or more implementations, network device 120 can receive and/or retrieve AV data via one or more other connections (aside from network 108), such as via a coaxial connection, via an over-the-air antenna connection, via a satellite connection, via a local hard drive connection, and the like. Network device 120 can process the received and/or retrieved AV data, for example by decrypting, encrypting, and/or packetizing (e.g., bundling data into packets according to a specific protocol) the AV data, and may forward the processed AV data to one or more of electronic devices 102, 104, 106.

Network device 120 can include a host processor for processing non-AV traffic and a dedicated processor, along with associated hardware/firmware, that exclusively processes AV traffic, for example, an AV stream processor. In a non-limiting example, an encoder, in accordance with one or more implementations of the subject technology, can be located at network device 120.

Figure 2:
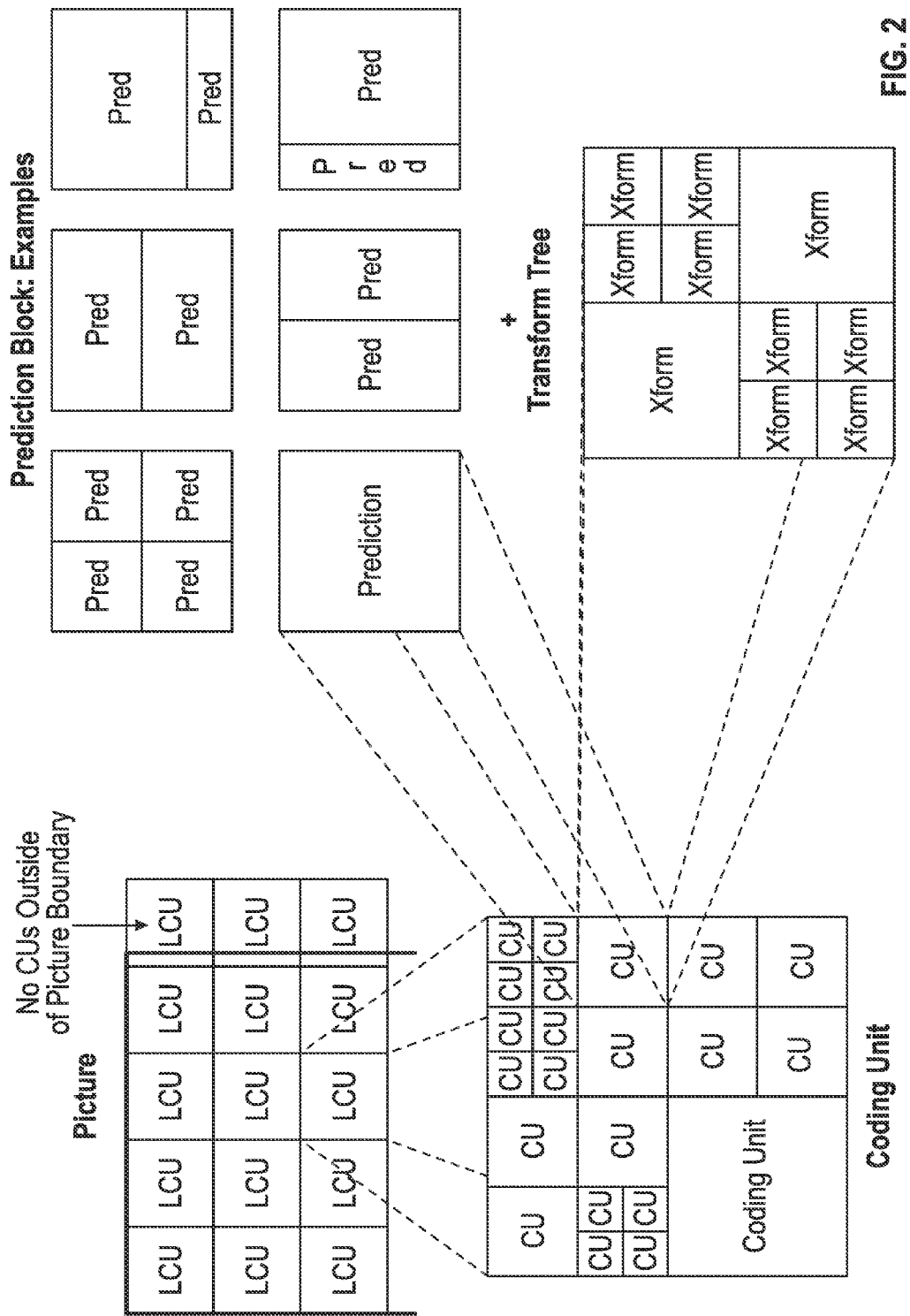
FIG. 2 illustrates an example block coding structure that may be used in High Efficient Video Coding (HEVC).

FIG. 2 illustrates an example block structure that can be used in HEVC. As noted above, to achieve better coding efficiency, HEVC can employ a flexible block coding structure.

As shown in FIG. 2, in HEVC, a picture can be divided into largest coding units (or LCUs) that can have dimensions up to, for example, 64×64 pixels. A LCU can be further decomposed into coding units or CUs. A CU can be as large as a LCU and the smallest CU size can be, for example, 8×8 pixels. At the CU level, a CU can be split into prediction units or PUs. The size of a PU can be smaller or equal to CU size for intra or inter prediction. A CU can be split into transform units or TUs (sized, for example, from 4×4 to 32×32 pixels) for transformation of predictions of residual blocks.

Within a LCU, some CUs can be intra-coded, while others can be inter-coded. Such a block structure can offer coding flexibility of using different PU sizes and TUs sizes based on characteristics of incoming content, especially the ability of using large block size tools (e.g., large PU sizes up to 64×64, large TU and quantization sizes up to 32×32), providing significant coding gain when compared to conventional 16×16 block based MPEG AVC/ITU-T H.264 coding.

Figure 3:
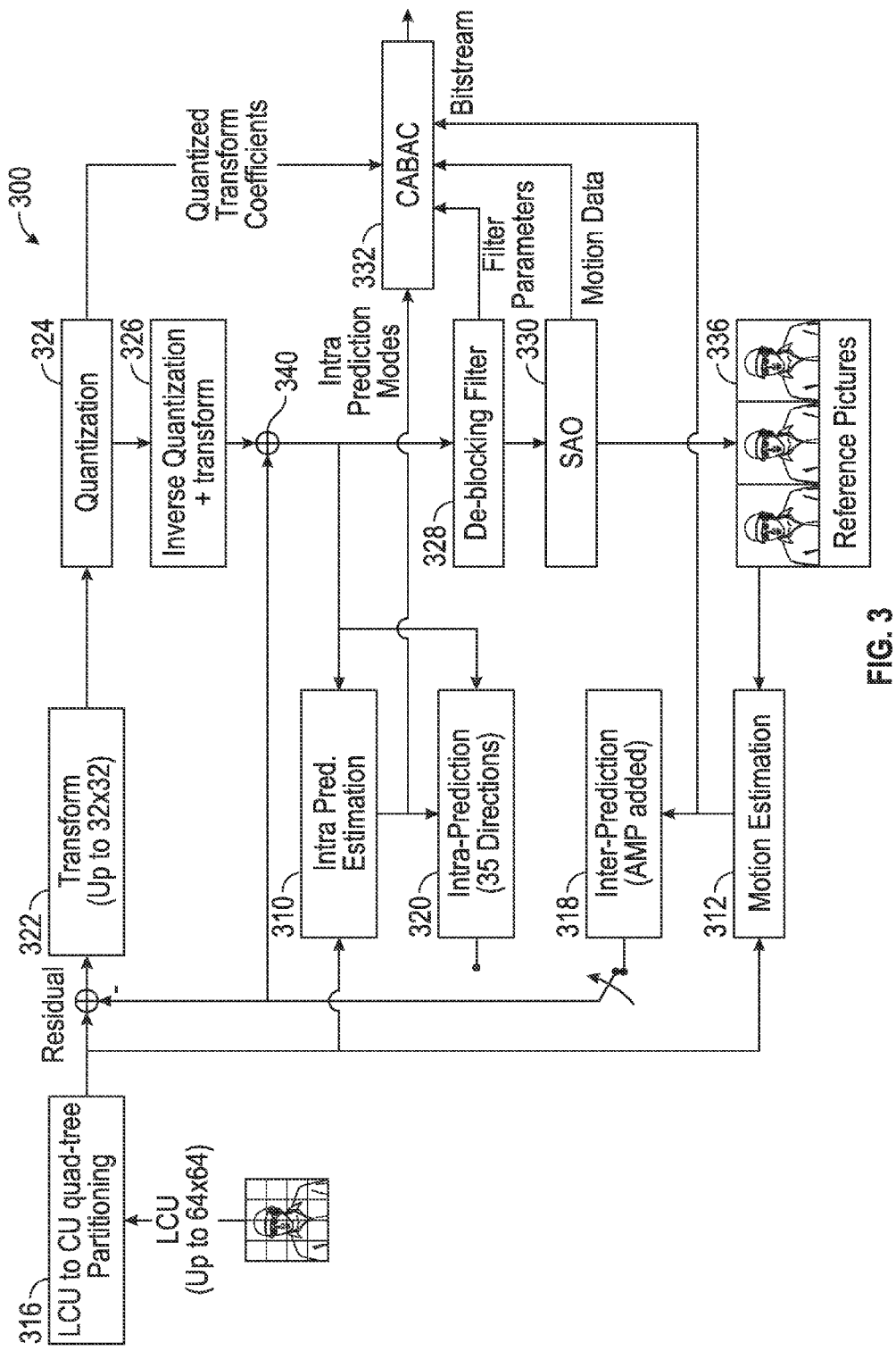
FIG. 3 illustrates an example HEVC encoder that may be used to implement a system for color blending prevention in accordance with one or more implementations.

FIG. 3 illustrates an example HEVC encoder 300. HEVC encoder 300 can be used to implement a system for color blending prevention in HEVC in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

HEVC can employ block-based intra/inter prediction, transform and quantization, and entropy coding to achieve video compression. As shown in FIG. 3, in HEVC, a picture to be encoded is divided into LCUs, a LCU is further decomposed into CUs at partitioning module 316. As an example, partitioning module 316 can use quad-tree partitioning to decompose a LCU into CUs. A quad tree is a tree data structure where each node or coding block can be resolved into four child coding blocks.

On each CU, motion estimation and intra prediction mode estimation are performed at motion estimator 312 and intra prediction estimator 310, respectively, to choose an optimal inter and intra-mode for a CU. Then an intra/inter decision is made at intra-prediction 320 and inter-prediction 318 to determine whether an intra or inter prediction residual is to be coded. The prediction residual can be obtained by subtracting a predicted video block from the predicted video block's corresponding video block in a current picture.

The prediction residual can be transformed at transformer 322 and quantized at quantizer 324. After transform and quantization, the CU is reconstructed at encoder 300 by passing through a processing chain of inverse quantization and inverse transform at inverse quantizer and inverse transformer 326, addition of the prediction block (CU) to the inverse transform output at adder 340 de-blocking at de-blocking filter 328 and sample adaptive offset (SAO) filtering at SAO filter 330. The reconstructed CU is stored in reference picture buffer 336.

Finally, at an LCU level the quantized transform coefficients along with supplemental information for the LCU can be encoded into an output bitstream by using Context Adaptive Binary Arithmetic Coding (CABAC) at CABAC coder 332. CABAC is a lossless compression technique and form of entropy encoding used in H.264/MPEG-4 AVC and HVEC video encoding. The supplemental information can include intra prediction modes, motion data and SAO filter coefficients.

A coding efficiency enhancement mechanism in HEVC is the merge/skip mode, which is designed for reducing overhead coding by allowing a current PU to inherit the motion data (e.g., motion vectors, prediction direction and reference picture index (or indices)) from a list of merging candidates derived from spatially neighboring PUs and temporally co-located PUs.

If merge mode is chosen in the motion estimation and mode decision phase of the encoder, a merging candidate index (e.g., "merge_idx") is bit stream encoded to indicate which merging candidate is selected from the merging candidate list of the current PU. A CU is skipped if the CU uses merge mode and does not have non-zero coefficients.

Figure 4:
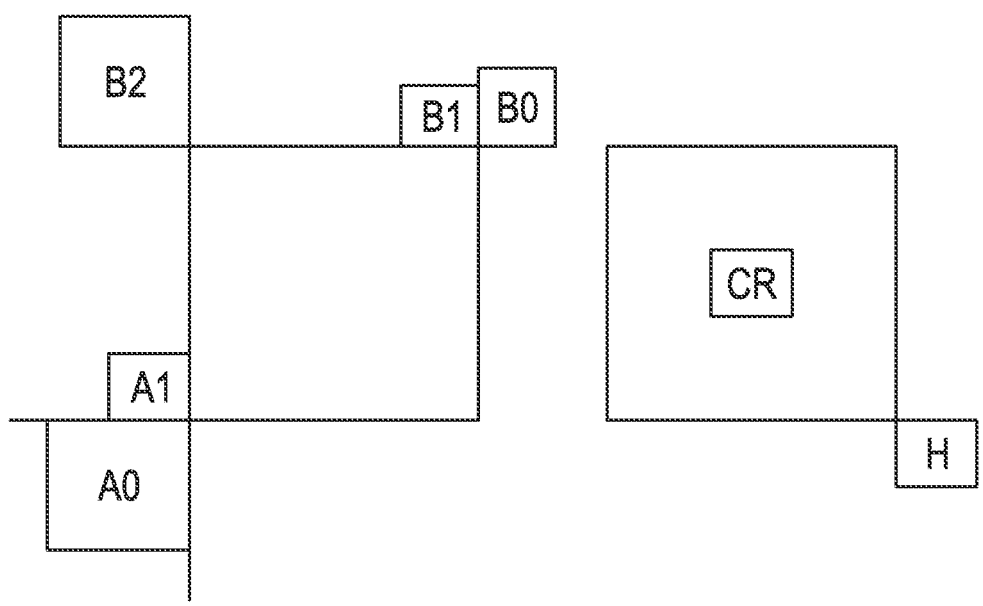
FIG. 4 illustrates candidate motion data positions an example HEVC merge mode.

FIG. 4 illustrates candidate motion data positions for the merge mode as can be used by HEVC. An HVEC merge mode can allow an inter-predicted PU to inherit the same motion vector(s), prediction direction, and reference picture(s) from an inter-predicted PU which contains a motion data position selected from a group of spatially neighboring motion data positions and one of two temporally co-located motion data positions.

Referring to FIG. 4, for a current PU, a merging candidate list is formed by considering merging candidates from seven example motion data positions illustrated in FIG. 4. The example positions include five spatially neighboring motion data positions, i.e., a bottom-left neighboring motion data position A1, an upper neighboring motion data position B1, an upper-right neighboring motion data position B0, a down left neighboring motion data position A0, an upper-left neighboring motion data position B2, a motion data position H bottom-right to the temporally co-located PU, and a motion data position CR inside the temporally co-located PU. To derive motion data from a motion data position, the motion data can be copied by an encoder from the corresponding PU which contains (or covers) the motion data position.

The spatial merging candidates, if available, are ordered by the encoder in the order of A1, B1, B0, A0 and B2 in the merging candidate list. The merging candidate at position B2 can be discarded if the merging candidates at positions A1, B1, B0 and A0 are all available. A spatial motion data position can be treated as being unavailable for the merging candidate list derivation if the corresponding PU that contains the motion data position is intra-coded, belongs to a different slice from the current PU, or is outside picture boundaries.

To choose a co-located temporal merging candidate, the co-located temporal motion data from the bottom-right motion data position (see (H) in FIG. 4, outside the co-located PU) can be first checked and selected by the encoder for a temporal merging candidate, if available. Otherwise, the co-located temporal motion data at the central motion data position (see (CR) in FIG. 4) can be checked by the encoder and selected for the temporal merging candidate if available. The temporal merging candidate can be placed in the merging candidate list by the encoder after the spatial merging candidates. A temporal motion data position can be treated as being unavailable if the corresponding PU containing the temporal motion data position in the co-located reference picture is intra-coded or outside the picture boundaries.

Figure 5:
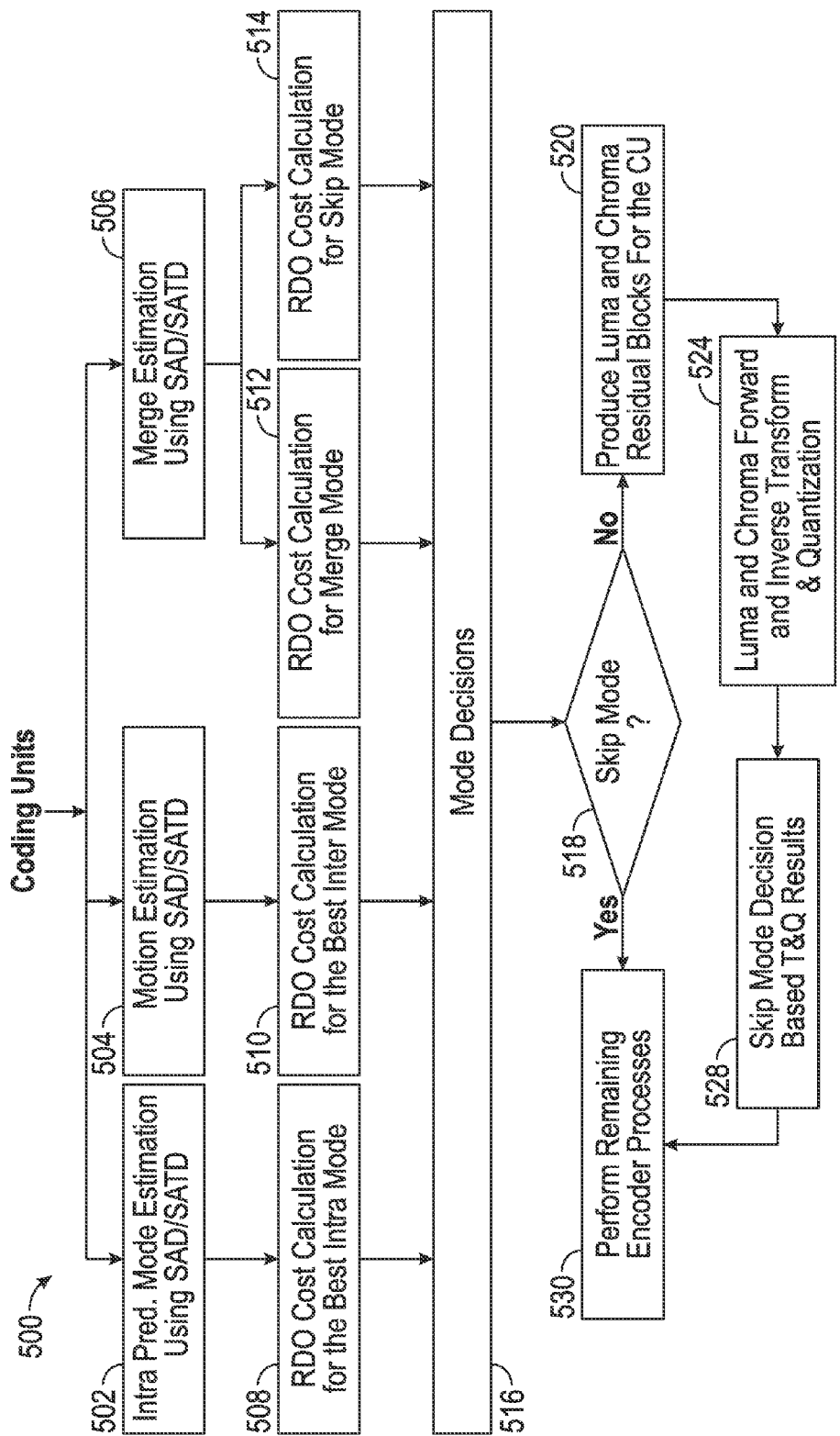
FIG. 5 illustrates an example flow diagram for operations that may be performed by a conventional HEVC encoder.

FIG. 5 illustrates an example flow diagram for operations that can be performed by a conventional HEVC encoder. Particularly, FIG. 5 illustrates example operations that may occur prior to and after a skip mode decision by an encoder.

Process 500 begins with intra-prediction mode estimation at step 502, motion estimation at step 504 and merge estimation at step 506. In one or more implementations steps 502, 504 can be performed in parallel on one or more coding units. In other implementations steps 502, 504 and 506 can be performed sequentially and in any sequence. For each CU, encoder 500 can use a Sum of Absolute Difference (or SAD) or Sum of Absolute Transform Difference (SATD) as a metric to perform intra-mode estimation, motion estimation and merge estimation.

Process 500 proceeds by calculating a rate distortion optimization (RDO) cost for selecting a best or optimal intra-mode (step 508), a best or optimal inter-mode (step 510), for a merge mode (step 512) and a skip mode (step 514). RDO is a method of improving video quality in video compression. The name refers to the optimization of the amount of distortion (loss of video quality) against the amount of data required to encode the video, the rate. While it is primarily used by video encoders, rate-distortion optimization can be used to improve quality in any encoding situation (image, video, audio, or otherwise) where decisions have to be made that affect both file size and quality simultaneously. As an example, RDO can act as a video quality metric, measuring both the deviation from the source material and a bit cost for each possible decision outcome.

After RDO costs are calculated for respective modes at steps 508, 510, 512 and 514, process 500 proceeds to make a mode decision (step 516). As an example, based on the RDO costs, the encoder makes a decision whether a current CU should be intra-coded or inter-coded (i.e., intra/inter decision). As an example, if the current CU is inter-coded, the encoder further decides whether the current CU should select the regular inter-prediction mode (which has dedicated motion data), the merge mode which inherits motion data from neighbors, or the skip mode which not only inherits motion data from neighbors but also can set all the coefficients (both luma and chroma) for the CU to zero.

In step 518, process 500 checks if the selected mode is a skip mode. If the selected mode is not a skip mode (No, step 518), luma and chroma residual blocks are produced for a CU being processed (step 520).

Process 500 then proceeds by performing luma and chroma forward and inverse transform, and quantization (step 524) and performs a re-evaluation of the skip mode decision based on the transformation and quantization results of step 524 and motion data of the CU. In other words, process 500 produces both the luma and chroma residual blocks for the CU, performs transformation, quantization, inverse quantization and inverse transform, and makes the skip decision again for CUs with CU-level merge mode based on transform and quantization (T&Q) results. Process 500 proceeds with other encoder operations at step 530.

Returning to step 518, if the selected mode is a skip mode (Yes, step 518), process 500 bypasses the encoder processing chain of residual block creation, forward transform, quantization, inverse quantization and inverse transform altogether and moves to step 530.

FIG. 6A illustrates example conventional HVEC coding test results. FIG. 6B lists video sequences that may be used for the HVEC coding test. For this example test, the parameters have been selected as follows: Quantization parameters (QP)=27, 32, 37, 42; two 1080p and five 720p sequences (e.g., sequences of table 602 of FIG. 6B); Rate-control off; IBBBP coding structure; no hier-B LCU size 64×64; and smallest coding unit (SCU) size 8×8.

As shown in table 600, there can be significant loss (e.g., 9.7%) across several test video sequences of table 602 if skip mode evaluation is switched off in an encoder's motion estimation and mode decision phase.

Furthermore, an early skip mode evaluation may create coding artifacts in some cases. Usually, only luma data is involved during motion estimation for a regular inter-mode and for merge/skip mode due to memory bandwidth and other architecture constraints. Therefore, early skip mode evaluation/decision is based solely on the luma data. While it can be true that if a luma prediction residual is sufficiently small and can thus be skipped, the chroma residual oftentimes is also small enough to be ignored. However, such a relationship between the luma and the chroma residual is not necessarily true at all times. There can be cases in which the luma prediction residual is small enough but chroma residual is still significantly large. In such cases, choosing skip mode in the motion estimation and mode decision phase may create undesirable coding artifacts (e.g., color blending, if the chroma block is predicting from a region of different color) because the significantly larger chroma prediction residual is not properly considered.

Figure 7:
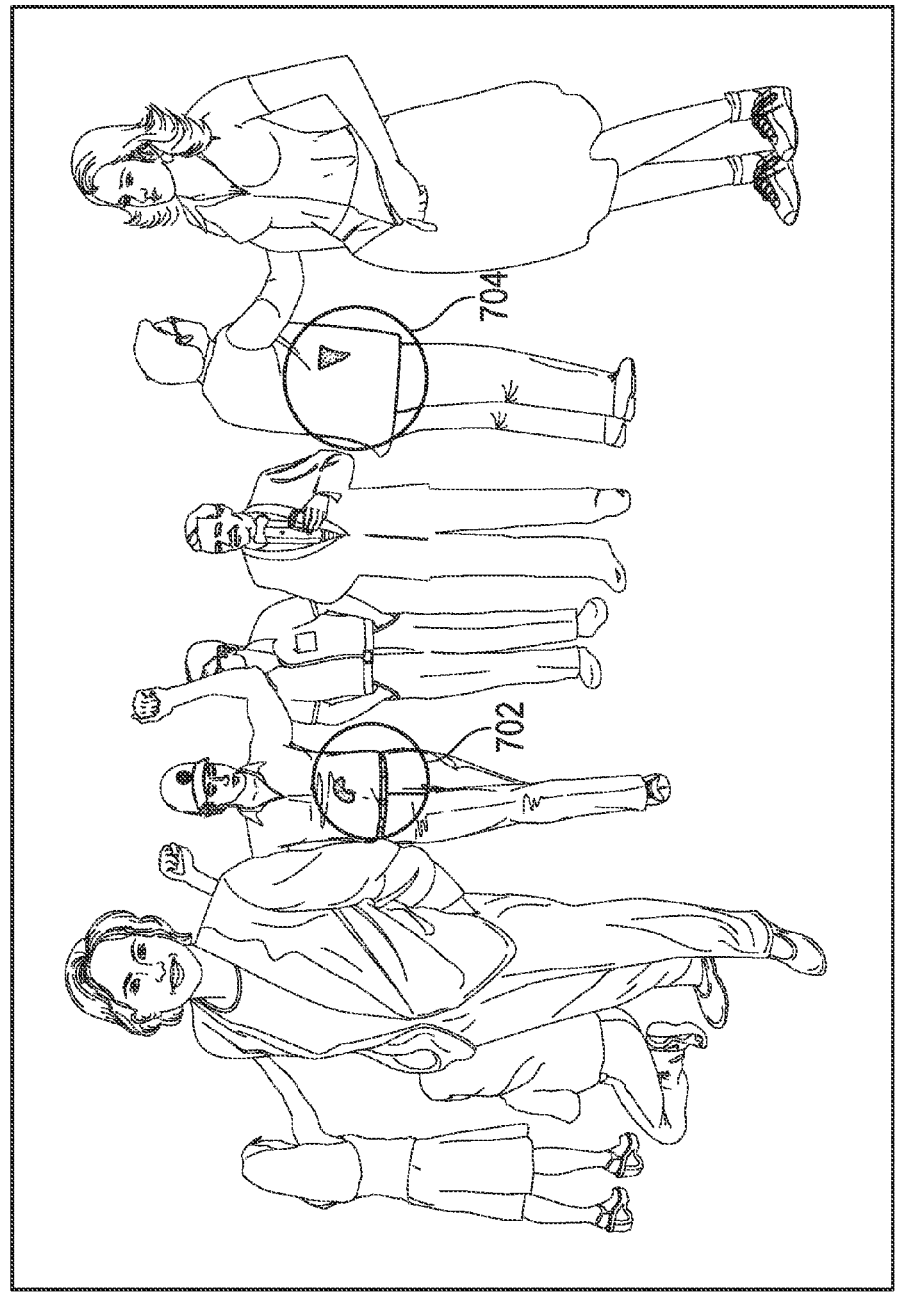
FIG. 7 illustrates an example sequence frame that has undesirable color blending artifacts.

FIG. 7 illustrates an example sequence frame that has an undesirable color blending artifact as indicated by regions 702 and 704. For example, region 702 has undesirable artifacts 710 on a background 712 and region 704 has undesirable artifacts 714 on a background 716. In this example scenario, an early skip mode evaluation/decision is based solely on the luma data.

In one or more implementations, to prevent coding artifacts such as color blending, selection of a skip mode is continually evaluated even after the skip mode is chosen in the motion estimation and mode decision phase of an encoder. In the skip mode, luma data transform coefficients are set to zero for a coding unit by an encoder. For chroma data, the encoder still produces residual blocks, and performs transform and quantization.

In some implementations, after transform and quantization is complete, the selection of the skip mode is re-evaluated based on quantized chroma transform coefficients. If there are no non-zero quantized chroma coefficients for a coding unit, the selection of the skip mode is confirmed and a current coding unit is skipped. Otherwise, the selection of the skip mode is revoked by the encoder and the non-zero quantized chroma coefficients are transmitted for the coding unit to compensate a chroma prediction residual. Such consideration to the chroma data can avoid coding artifacts caused by an early skip mode decision while still maintaining high coding efficiency.

Figure 8:
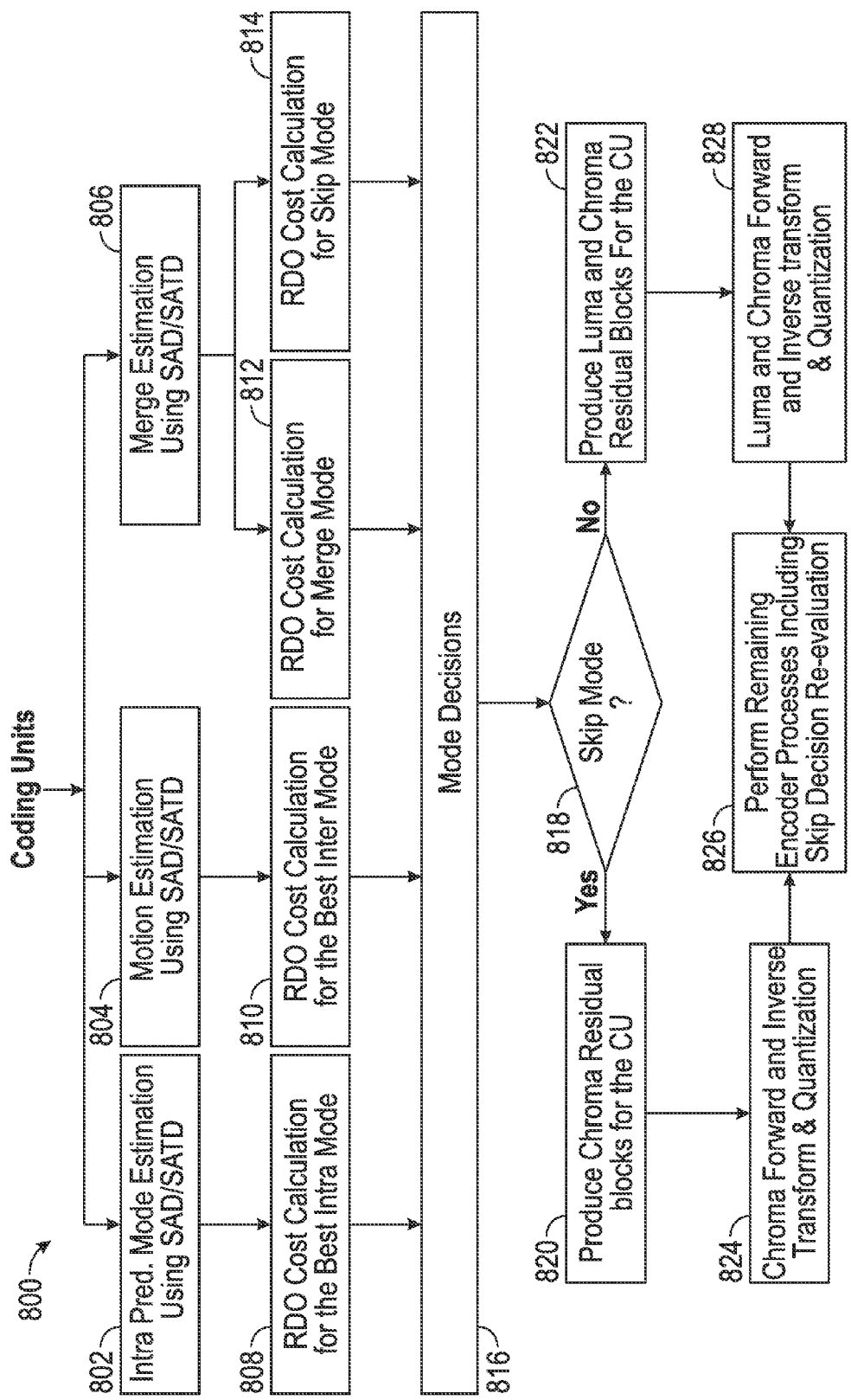
FIG. 8 illustrates an example flow diagram of operations that may be performed by an encoder configured to prevent color blending artifacts.

FIG. 8 illustrates an example flow diagram 800 for operations that may be performed by an encoder configured to prevent color blending artifacts in HEVC. Particularly, FIG. 8 illustrates example operations that may occur prior to and after a skip mode decision by an encoder. As an example, the operations of process 800 may be implemented within encoder 300.

Process 800 begins with intra-prediction mode estimation at step 802, motion estimation at step 804 and merge estimation at step 806. In one or more implementations steps 802, 804 may be performed in parallel on one or more coding units. In other implementations steps 802, 804 may be performed sequentially and in any sequence.

Process 800 proceeds by calculating a rate distortion optimization (RDO) cost for selecting a best or optimal intra-mode (step 808), a best or optimal inter-mode (step 810), for a merge mode (step 812) and skip modes (step 814). As discussed above, RDO can act as a video quality metric, measuring both the deviation from the source material and a bit cost for each possible decision outcome.

After RDO costs are calculated for respective modes at steps 808, 810, 812 and 814, process 800 proceeds to make a mode decision (step 816). In step 818, process 800 checks if the selected mode is a skip mode. If the selected mode is a skip mode (Yes, step 818), chroma residual blocks are produced for a CU being processed (step 820). The process then proceeds by performing chroma forward and inverse transform, and quantization (step 824) with other encoding steps including a re-evaluation of the skip decision (step 826). In one or more implementations, if there are no non-zero quantized chroma coefficients for a coding unit, the selection of the skip mode is confirmed and a current coding unit is skipped. Otherwise, the selection of the skip mode is revoked and the non-zero quantized chroma coefficients are transmitted for the coding unit to compensate a chroma prediction residual.

Returning to step 818, if the selected mode is not a skip mode (No, step 818), process 800 proceeds to produce luma and chroma residual blocks for the CU (step 822) and then performs a luma and chroma forward and inverse transform quantization (step 828). From step 828, process 800 proceeds to step 826.

Figure 10:
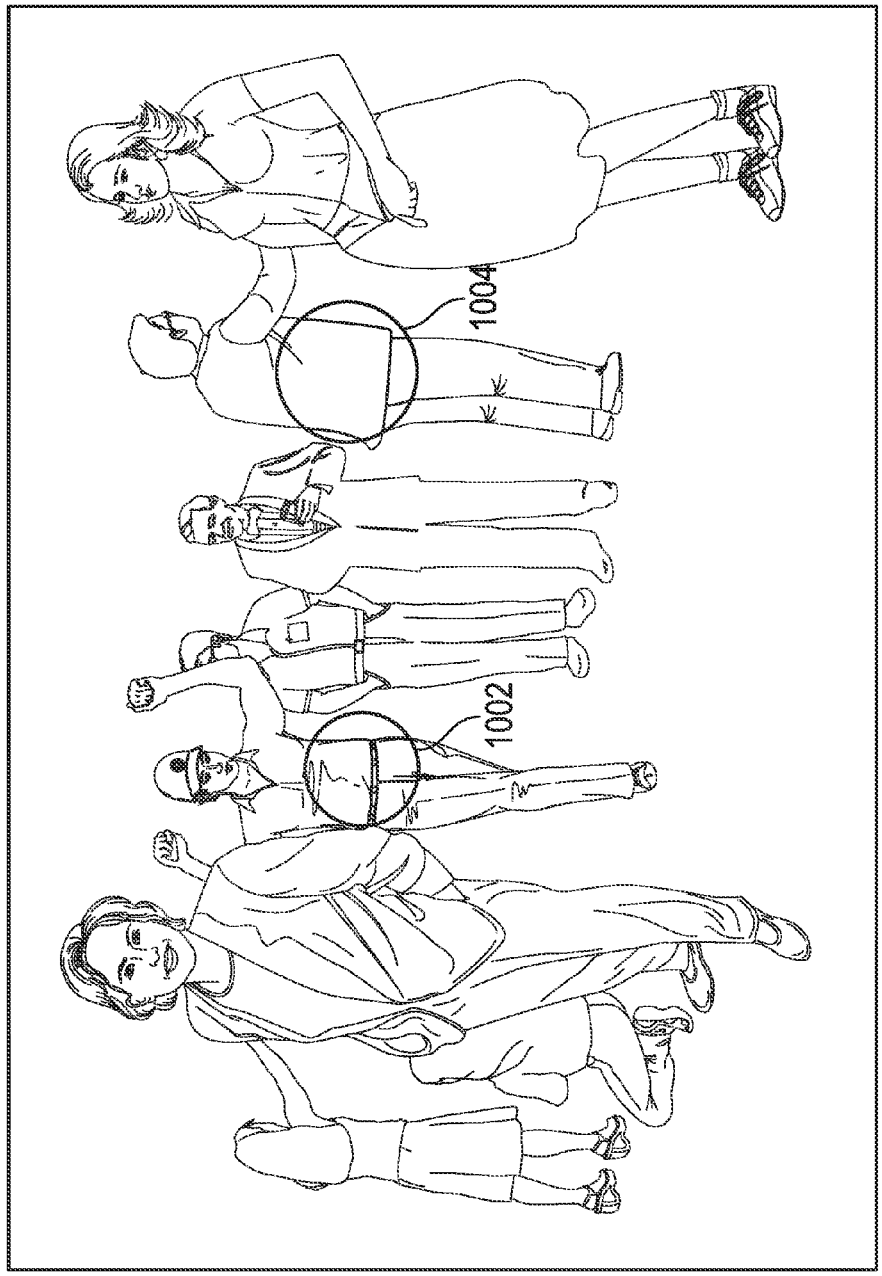
FIG. 10 illustrates the example sequence frame of FIG. 7 with color blending artifacts removed in accordance with one or more implementations.

FIG. 9 illustrates table 900. Table 900 discloses an example reduction of average coding loss in according with one or more implementations. Referring to table 900, coding loss has been reduced from 9.7% (as shown in table 600 in FIG. 6A) to 1.3% as shown in table 900. Furthermore, color blending artifacts have been removed as shown in regions 1002 and 1004 of FIG. 10. Particularly, and in comparison to regions 702 and 704 of FIG. 7, the artifacts of region 702 and the artifacts of region 704 have been removed in regions 1002 and 1004, respectively.

In this way, by giving consideration to chroma data during a skip mode decision process even after skip mode is chosen in the motion estimation and mode decision phase of the encoder, the disclosed implementations can avoid coding artifacts caused by an early skip mode decision while still maintaining high coding efficiency for the encoder.

Figure 11:
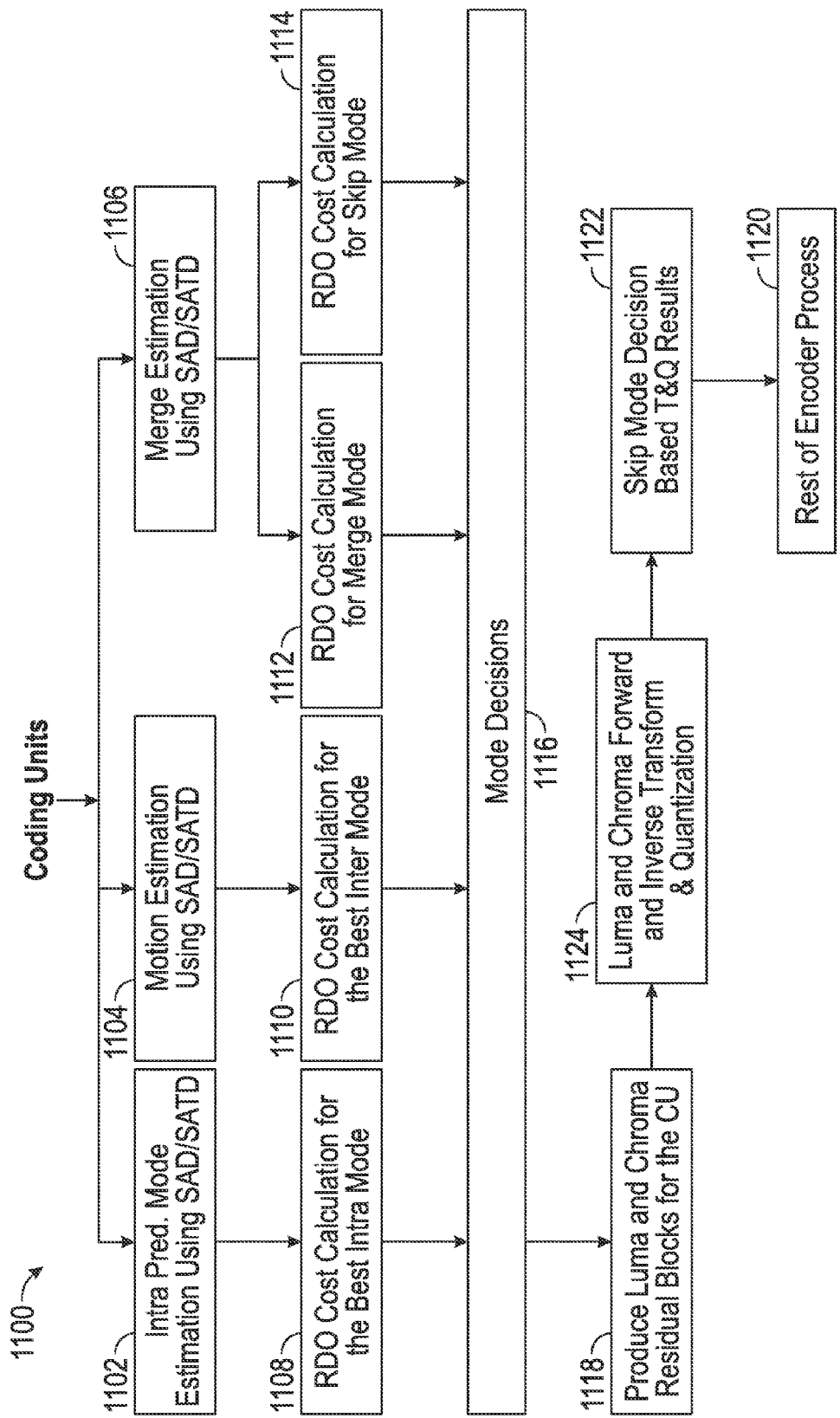
FIG. 11 illustrates another example flow diagram for operations that may be performed by an encoder configured to prevent color blending artifacts.

FIG. 11 illustrates an operation where an encoder may still evaluate the cost of a skip mode during motion estimation but not make an early skip mode decision (or not force luma and chroma transform coefficients to zero), and perform skip mode decision after transform and quantization. As an example, the operations of process 1100 may be implemented within encoder 300.

Process 1100 begins with intra-prediction mode estimation at step 1102, motion estimation at step 1104 and merge estimation at step 1106. In one or more implementations steps 1102, 1104 and 1106 may be performed in parallel by an encoder. In other implementations steps 1102, 1104 and 1106 may be performed sequentially and in any sequence.

Step 1106 proceeds by calculating an RDO cost for selecting a best or optimal intra-mode (step 1108), a best or optimal inter-mode (step 1110, a merge mode (step 1112) and a skip mode (step 1114).

After RDO costs are calculated for respective modes at steps 1108, 1110, 1112 and 1114, process 1100 proceeds to make a mode decision (step 1116). In step 1118, process 1100 proceeds to produce luma and chroma residual blocks for a CU that is being processed. Then, luma and chroma forward and inverse transform, and quantization operations are performed (step 1124). Following, a skip mode decision is made based on the forward and inverse transform and quantization results (step 1122). Process 1100 then proceeds with other encoder processes at step 1120.

In one or more implementations, a skip mode decision made in the motion estimation and mode decision phase may be revoked only when there is at least one non-zero quantized chroma DC coefficient in the CU after transform and quantization. In other words, the skip mode decision made in the motion estimation and mode decision phase can still be honored as long as there is no non-zero chroma DC coefficient in the CU after transform and quantization, regardless whether there are any other non-DC or non-zero chroma quantized coefficients.

Figure 12:
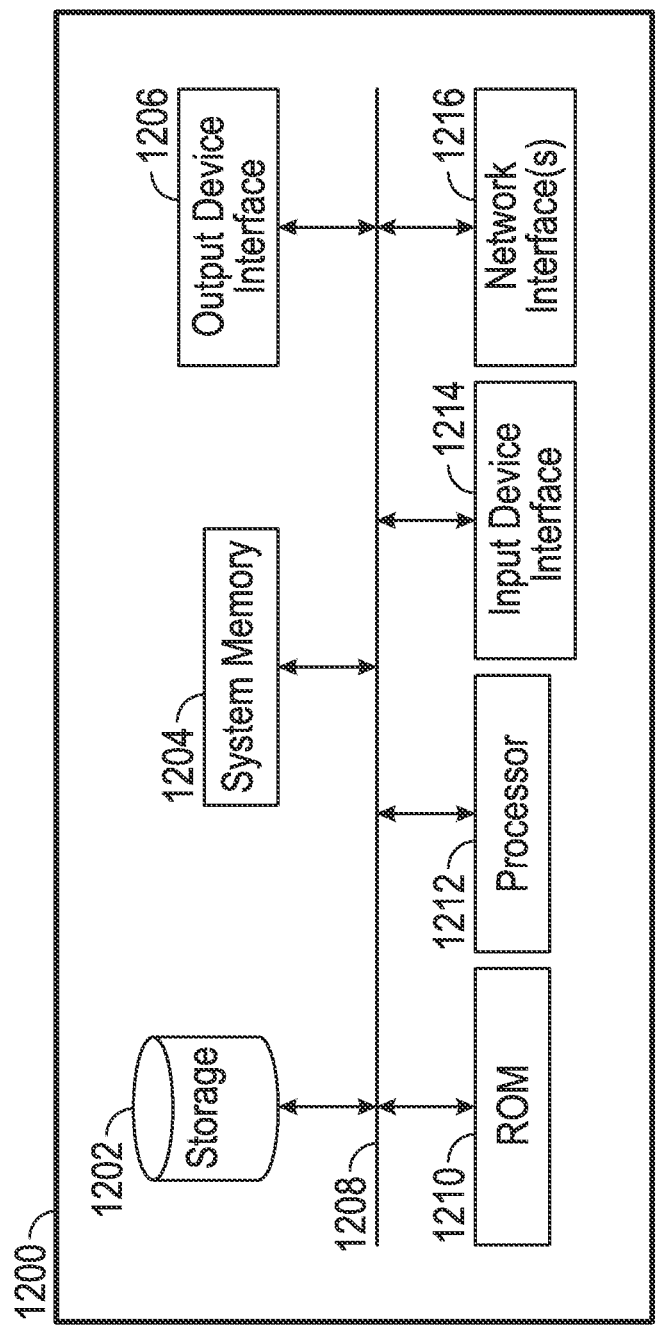
FIG. 12 is a diagram illustrating an example electronic system for use in connection with color blending prevention in video coding, including a processor and other related components.

FIG. 12 is a diagram illustrating an example electronic system 1200 for use in connection with color blending prevention in video coding, including a processor and other related components, in accordance with one or more implementations of the subject technology. Electronic system 1200, for example, is representative of the computing hardware embedded within, integrated with, or for providing functional operation of, the previously described systems and operations, including AV server 110 and/or the process 800 of FIG. 8. In one or more aspects, electronic system 1200 may be a desktop computer, a laptop computer, a tablet computer, a server, a switch, a router, a base station, a receiver, a phone, a personal digital assistant (PDA), or generally any electronic device that transmits signals over a network. Such an electronic system includes various types of computer readable media and interfaces for various other types of computer readable media. Electronic system 1200 includes bus 1208, processing unit(s) 1212, system memory 1204, read-only memory (ROM) 1210, permanent storage device 1202, input device interface 1214, output device interface 1206, and network interface 1216, or subsets and variations thereof.

Bus 1208 collectively represents all system, peripheral, and chipset buses that communicatively connect the numerous internal devices of electronic system 1200. In one or more implementations, bus 1208 communicatively connects processing unit(s) 1212 with ROM 1210, system memory 1204, and permanent storage device 1202. From these various memory units, processing unit(s) 1212 retrieves instructions to execute and data to process in order to execute the processes of the subject disclosure. The processing unit(s) can be a single processor or a multi-core processor in different implementations.

ROM 1210 stores static data and instructions that are needed by processing unit(s) 1212 and other modules of the electronic system. Permanent storage device 1202, on the other hand, is a read-and-write memory device. This device is a non-volatile memory unit that stores instructions and data even when electronic system 1200 is off. One or more implementations of the subject disclosure use a mass-storage device (such as a magnetic or optical disk and its corresponding disk drive) as permanent storage device 1202.

Other implementations use a removable storage device (such as a floppy disk, flash drive, and its corresponding disk drive) as permanent storage device 1202. Like permanent storage device 1202, system memory 1204 is a read-and-write memory device. However, unlike storage device 1202, system memory 1204 is a volatile read-and-write memory, such as random access memory. System memory 1204 stores any of the instructions and data that processing unit(s) 1212 needs at runtime. In one or more implementations, the processes of the subject disclosure are stored in system memory 1204, permanent storage device 1202, and/or ROM 1210. From these various memory units, processing unit(s) 1212 retrieves instructions to execute and data to process in order to execute the processes of one or more implementations.

Bus 1208 also connects to input and output device interfaces 1214 and 1206. Input device interface 1214 enables a user to communicate information and select commands to the electronic system. Input devices used with input device interface 1214 include, for example, alphanumeric keyboards and pointing devices (also called "cursor control devices"). Output device interface 1206 enables, for example, the display of images generated by electronic system 1200. Output devices used with output device interface 1206 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to a user or device can be any form of sensory feedback, such as visual feedback, auditory feedback, or tactile feedback; and input from the user or device can be received in any form, including acoustic, speech, or tactile input.

As shown in FIG. 12, bus 1208 also couples electronic system 1200 to a network (not shown) through network interface 1216. In this manner, the computer can be a part of a network of computers (such as a local area network ("LAN"), a wide area network ("WAN"), or an Intranet, or a network of networks, such as the Internet. Any or all components of electronic system 1200 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, for example, via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   selecting, in a mode decision phase of an encoding of a video frame, to encode an output bit stream in skip mode;
   setting unquantized luma component transform coefficients for a coding unit of the video frame to zero responsive to selecting the skip mode;
   re-evaluating the selection of the skip mode based on quantized chroma coefficients and independent of the unquantized luma component transform coefficients of the coding unit, the quantized chroma coefficients generated from transformed and quantized residual chroma components;
   confirming the selection of the skip mode when there are no non-zero quantized chroma coefficients; and
   revoking the selection of the skip mode when there are non-zero quantized chroma coefficients, wherein the non-zero quantized chroma coefficients are transmitted for the coding unit when the selection of the skip mode is revoked.

2. The method of claim 1, further comprising:
   calculating a rate distortion optimization (RDO) cost for selecting an optimal intra-mode, inter-mode, merge mode and skip mode.

3. The method of claim 1, wherein the video frame is a color video frame.

4. The method of claim 1, further comprising:
   suspending setting chroma transform coefficients to zero; and
   performing a skip mode decision after transform and quantization of the chroma transform coefficients.

5. The method of claim 1, the revoking further comprising:
   revoking the selection of the skip mode when there is at least one non-zero quantized chroma coefficient in the coding unit after transform and quantization of chroma coefficients.

6. The method of claim 1, further comprising:
   transmitting the non-zero quantized chroma coefficients with Context Adaptive Binary Arithmetic Coding (CABAC).

7. The method of claim 1, wherein the coding unit is a High Efficient Video Coding (HVEC) coding unit.

8. An integrated circuit comprising circuitry configured to:
   select, in a mode decision phase of an encoding of a video frame, to encode an output bit stream in skip mode, wherein the skip mode includes altering encoding of a coding unit of the video frame by setting luma component transform coefficients for the coding unit to zero, the selecting being performed independent of chroma component transform coefficients and independent of other coding modes;
   re-evaluate the selection of the skip mode based on quantized chroma coefficients and independent of the luma component transform coefficients, the quantized chroma coefficients generated from transformed and quantized residual chroma components;

confirm the selection of the skip mode when there are no non-zero quantized chroma coefficients; and revoke the selection of the skip mode when there are non-zero quantized chroma coefficients, wherein the non-zero quantized chroma coefficients are transmitted when the selection of the skip mode is revoked.

9. The integrated circuit of claim 8 further comprising circuitry configured to:

calculate a rate distortion optimization (RDO) cost for selecting an optimal intra-mode, inter-mode, merge mode and skip mode.

10. The integrated circuit of claim 8 wherein the video frame is a color video frame.

11. The integrated circuit of claim 8 further comprising circuitry configured to:

suspend setting chroma transform coefficients to zero; and perform a skip mode decision after transform and quantization of the chroma transform coefficients.

12. The integrated circuit of claim 8 further comprising circuitry configured to:

revoke the selection of the skip mode when there is at least one non-zero quantized chroma coefficient in the coding unit after transform and quantization of chroma coefficients.

13. The integrated circuit of claim 8 further comprising circuitry configured to:

transmit the non-zero quantized chroma coefficients with Context Adaptive Binary Arithmetic Coding (CABAC).

14. The integrated circuit of claim 8 wherein the coding unit is a High Efficient Video Coding (HVEC) coding unit.

15. A computer program product comprising instructions stored in a non-transitory computer-readable storage medium, the instructions comprising:

instructions to select, in a mode decision phase of an encoding of a current video frame, to encode an output bit stream in skip mode, wherein the skip mode includes altering encoding of a coding unit of the current video frame by setting luma component transform coefficients for the coding unit to zero;

instructions for re-evaluating the selection of the skip mode based on quantized chroma coefficients and independent of the luma component transform coefficients of the coding unit, the quantized chroma coefficients generated from transformed and quantized residual chroma components;

instructions for confirming the selection of the skip mode when there are no non-zero quantized chroma coefficients; and instructions for revoking the selection of the skip mode when there are non-zero quantized chroma coefficients, wherein the non-zero quantized chroma coefficients used in re-evaluating the selection of the skip mode are transmitted for the coding unit when the selection of the skip mode is revoked.

16. The computer program product of claim 15, the instructions further comprising:

instructions for calculating a rate distortion optimization (RDO) cost for selecting an optimal intra-mode, inter-mode, merge mode and skip mode.

17. The computer program product of claim 15, wherein the current video frame is a color video frame.

18. The computer program product of claim 15, the instructions further comprising:

instructions for suspending setting chroma transform coefficients to zero; and instructions for performing a skip mode decision after transform and quantization of the chroma transform coefficients.

19. The computer program product of claim 15, the instructions further comprising:

instructions for transmitting the non-zero quantized chroma coefficients with Context Adaptive Binary Arithmetic Coding (CABAC).

20. The computer program product of claim 15, wherein the coding unit is a High Efficient Video Coding (HVEC) coding unit.

21. The method of claim 1, wherein the luma component transform coefficients set to zero are transmitted with the non-zero quantized chroma coefficients when the selection of the skip mode is revoked.

* * * * *